June 17, 1924.

M. J. NICHLES

COMBINED VALVE AND PRESSURE GAUGE

Filed Aug. 25, 1923

Inventor
Mose J. Nichles
William A. Strauch

By

Attorney

Patented June 17, 1924.

1,498,477

UNITED STATES PATENT OFFICE.

MOSE J. NICHLES, OF LOS ANGELES, CALIFORNIA, ASSIGNOR OF ONE-HALF TO CARL GUSTAF GUSTAFFSON, OF LOS ANGELES, CALIFORNIA.

COMBINED VALVE AND PRESSURE GAUGE.

Application filed August 25, 1923. Serial No. 659,345.

*To all whom it may concern:*

Be it known that MOSE J. NICHLES, a citizen of the United States, residing at No. 835 North Rowan Avenue, Los Angeles, in the county of Los Angeles and State of California, has invented certain new and useful Improvements in Combined Valves and Pressure Gauges, of which the following is a specification.

The invention relates to a combined valve and pressure gauge for inflating tires and like articles to predetermined pressures, rapidly and in a convenient manner.

When, for example, an automobile tire is to be inflated, it is common practice to use a gauge which is independent in structure from the valve controlling the admission of air. To properly inflate a tire by this method it is necessary to be continually removing the inflating valve and trying the pressure until the proper pressure has been reached. This results in loss of time and in inconvenience. Numerous attempts have been made to combine the valve and gauge structure but none have attained commercial success because of the complicated, intricate, and delicate structures, and because of other defects in these proposed devices.

An object of the present invention is to provide a simplified combination of pressure gauge and inflating valve of more convenient, efficient, and rugged structure than has been heretofore produced.

Another object of the invention is to provide a combined valve and pressure gauge in which an audible signal is given when the desired pressure is reached.

A further object of the invention is to provide a combination valve and pressure gauge adapted to prevent injurious inflation, over and above the desired pressure.

Still other objects will appear in the following disclosure of a preferred embodiment of the invention of which—

Figure 1:
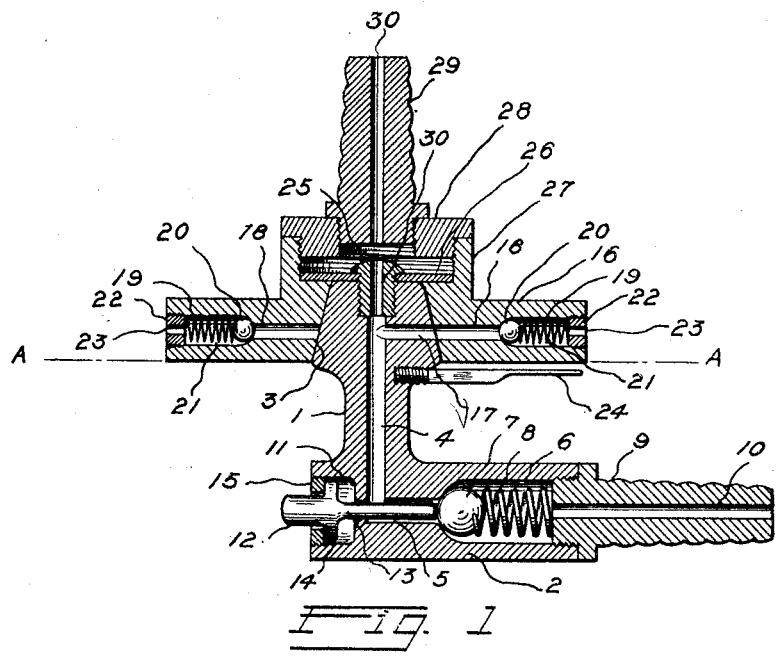
Figure 1 is a sectional view showing a preferred form.
Figure 2:
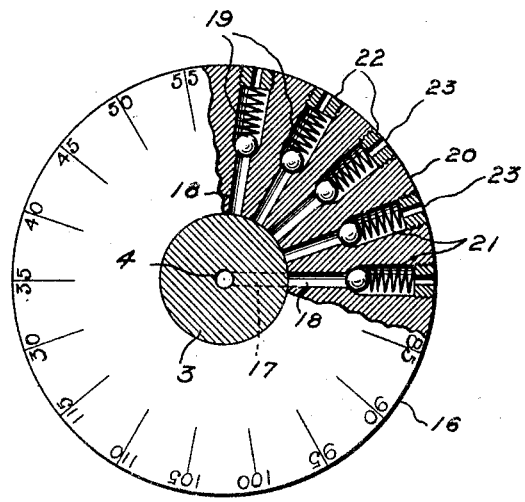
Figure 2 is a sectional view taken along line A A of Figure 1, with a part broken away to show the gauge structure.

A body portion 1 has formed integrally therewith an extension 2, and an enlarged tapered seating portion 3. An air passage 4 extends through body 1 and connects at one end with an air passage 5 in extension 2. Passage 5 is enlarged into a valve chamber 6 and is adapted to be closed by a ball 7 held against the end of opening 5 by a light spring 8 and by air pressure as will more fully hereinafter appear. Spring 8 is seated against the end of air hose connection 9 which is secured to extension 2 by a screw threaded joint, or in any other well known or convenient manner. A hose leading to a supply of air or other gas under pressure is, in practice, fitted over the shank of 9, and air under pressure is admitted to chamber 6 through passage 10.

At its other end, passage 5 may be reduced in diameter and connects with an enlarged chamber 11 in which a collar 14 of valve controlling member 12 is arranged to slide. An extension 13 of member 12 extends through passage 5 and engages valve ball 7. Spring 6 and the air pressure on ball 7 normally hold member 12 to the left in Figure 1, with shoulder 14 thereof against a plug 15 screwed into chamber 11. It will be noted that member 12, collar 14 and extension 13 are so fitted that when 12 is pressed to the right in Figure 1, no air leak occurs from passage 5 through chamber 11.

Rotatably journaled on seating portion 3 is a pressure indicating and release head 16. A passage 17, in seating portion 3 connects at one end with passage 4 and at the other end is adapted to connect with any one of a plurality of air passages 18 which extend radially through a portion of head 16. Passages 18 are spaced evenly all around the head 16 and connect at their outer ends with valve chambers 19. In each valve chamber 19, a ball 20 is normally held by means of a spring 21, against the ends of passages 18. Springs 21 are held in place by means of screw plugs 22, each plug being provided with an opening 23 through which air may be exhausted, and which may be square or angular in shape to permit insertion of a tool for the purpose of adjusting the plugs and in this manner regulating the tensions of springs 21. Each spring 21 is of such size and placed under such initial compression that fixed pressures, differing preferably by definite amounts, are required to move balls 21 away from their seats. Above each of these valves is marked the pressure at which springs 21 will give and permit escape of air through passages 18 and 23 to atmosphere. Rigidly secured to body portion 1 is a pointer 24. Pointer 24 is so aligned that when a given graduation on head 16 is brought beneath the pointer, the passage 18 and valve corresponding to the pressure marked on the given graduation, are in connection with passage 17 in seating member 3.

Head 16 is held rotatably in place on member 3 by means of a screw plug 25 and a washer 26. It will be understood that these parts are so fitted as to make head 16 easily rotatable on member 3 but without permitting air leaks or play in the joints. A suitable stop cock or other lubricant may of course be applied to insure air tight joints, and to guard against binding. Screwed into extension 27 of head 16 is an end plug 28 into which is secured a standard hose connection 29, by a screw threaded or other well known form of joint. Air passages 30 are provided through connection 29 and through plug 26 to passage 4. A hose is provided leading from 29 and having at its end a suitable attachment for connection with a tire or other object to be inflated. If desired a connector of any well known type may be substituted for hose connection 29 without departing from the spirit of the invention.

Operation.

In operation passage 10 is connected to the pressure supply or source. Head 16 is rotated until the graduation marked with the pressure desired is directly beneath the end of pointer 24. Passage 30 is then connected with the tire to be inflated by suitable means and valve controlling member 12 is pressed inwardly and held causing extension 13 to push ball 7 away from opening 5. The air from the pressure supply source then passes through 5 into passage 4 and through passage 30 into the tire. This continues until the pressure in the tire has been built up to a point where it will force the ball 20 away from its seat and opening the passage 18 which has been aligned with 17 outwardly. This will of course be the pressure which has been set up under pointer 24. When the ball 20 moves outwardly the air under pressure will go through passages 17 and 18 and through the set opening 23 to atmosphere. The pressure in the tire will of course be built up to the desired amount and retained by the tire valve. Being above atmospheric pressure, no further air will be admitted to the tire, and the air from the pressure supply will necessarily exhaust through 23. As it exhausts a hissing or whistling sound is given and this indicates to the operator that the desired pressure has been reached in the tire. The operator will then release member 12 and ball 7 will again be seated against the end of passage 5. The air from the pressure supply pump or tank will then be cut off, ball 20 again closes passage 18, and passage 30 is finally disconnected from the inflated tire.

It will be seen that a convenient means of inflating a tire to different definite desired pressures has been provided, in which over inflation can not occur when properly operated, and in which an audible indication is given as soon as the desired pressure is attained in the tire. It will also be apparent that many modifications of the device may be made by persons skilled in the art without departing from the spirit of the invention.

Having described and shown a preferred embodiment of the invention, what is desired to be secured by Letters Patent and claimed as new is:

1. A pressure gauge comprising a body portion, passages in said body portion, a movable head, and a plurality of pressure release valves in said head adjusted to operate at definite differing pressures to predetermine the maximum pressure which may be carried in said passages.

2. A pressure gauge comprising a body portion, passages in said body portion, a rotatable head, and means carried in said head for predetermining the maximum pressure which may be carried in said head; said last mentioned means comprising a plurality of pressure release valves arranged in passages extending radially from the center of said head.

3. The combination as set forth in claim 2 in which said pressure release valves each comprises a ball, and an adjustable spring to hold said balls in position to close said radial passages.

4. A pressure gauge comprising a body portion; a passage in said body portion; a rotatable head on said body portion; a plurality of passages in said head, positioned to be brought into registration with said body passage; and a pressure release valve in each of said passages in said head.

5. The combination as set forth in claim 4 together with graduations on said head and an index fastened to said body portion in such manner that when a given graduation is set under said index, a corresponding release valve passage is brought into registration with said single body portion passage.

6. The combination as set forth in claim 2, together with means for giving an audible signal when any one of said pressure valves is released.

Signed at Los Angeles, California, this 18th day of August, 1923.

MOSE J. NICHLES.